(12) United States Patent
Vogman

(10) Patent No.: US 6,628,013 B2
(45) Date of Patent: Sep. 30, 2003

(54) REDUNDANT POWER SUBSYSTEM

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 09/726,824

(22) Filed: Nov. 30, 2000

(65) Prior Publication Data

US 2002/0036431 A1 Mar. 28, 2002

Related U.S. Application Data

(63) Continuation-in-part of application No. 09/670,891, filed on Sep. 28, 2000, now abandoned.

(51) Int. Cl.[7] .................................................. H02J 1/00
(52) U.S. Cl. ............................. 307/85; 307/65; 307/66; 307/80; 307/87; 307/140
(58) Field of Search .......................... 307/65, 66, 80, 307/140, 85, 87

(56) References Cited

U.S. PATENT DOCUMENTS 3,555,290 A * 1/1971 Ellermeyer ................. 307/204
3,641,424 A * 2/1972 Kuykendall .................. 323/17
3,967,185 A * 6/1976 Brooks ......................... 321/61
5,477,091 A * 12/1995 Fiorina et al. ............... 307/66
5,786,682 A * 7/1998 Aiken et al. .................. 320/6
5,917,253 A * 6/1999 Rusnack ...................... 307/64
5,939,799 A * 8/1999 Weinstein .................... 307/64
6,369,552 B2 * 4/2002 Goyhenetche et al. ...... 323/266

* cited by examiner

Primary Examiner—Gregory J. Toatley, Jr.
Assistant Examiner—Robert L. DeBeradinis
(74) Attorney, Agent, or Firm—Trop, Pruner & Hu, P.C.

(57) ABSTRACT

A system includes a first voltage regulator, a second voltage regulator, a third voltage regulator and a circuit. The first voltage regulator is coupled to receive power from a first power line, and the second voltage regulator coupled to receive power from a second power line. The circuit monitors a voltage of at least one of the first and second power lines and based on the monitored voltage, the circuit selectively couples the third voltage regulator to receive power from one of the first and second power lines.

9 Claims, 5 Drawing Sheets

| VOLTAGE REGULATOR MODULE | POWER LINE 22 PASS; POWER LINE 24 PASS | POWER LINE 22 PASS; POWER LINE 24 FAIL | POWER LINE 22 FAIL; POWER LINE 24 PASS |
|---|---|---|---|
| $12_1$ | OPERATIONAL | OPERATIONAL | NOT OPERATIONAL |
| $12_2$ | OPERATIONAL | OPERATIONAL | OPERATIONAL |
| $12_3$ | OPERATIONAL | NOT OPERATIONAL | OPERATIONAL |
FIG. 2
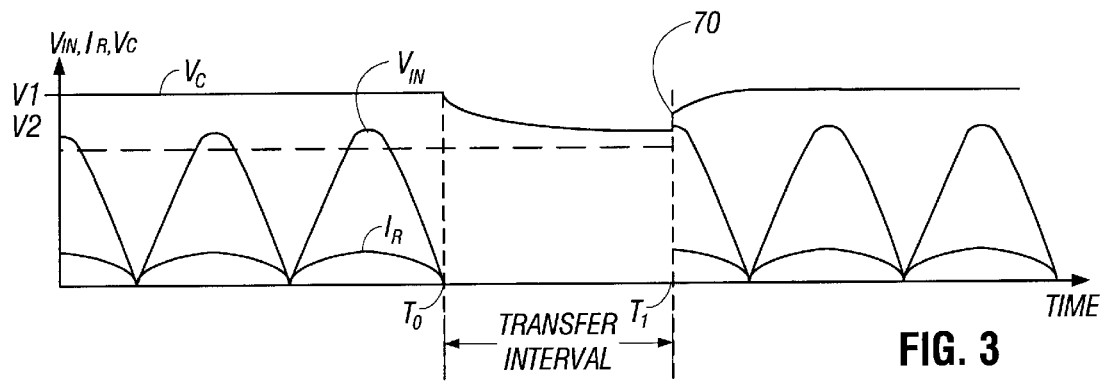
FIG. 3
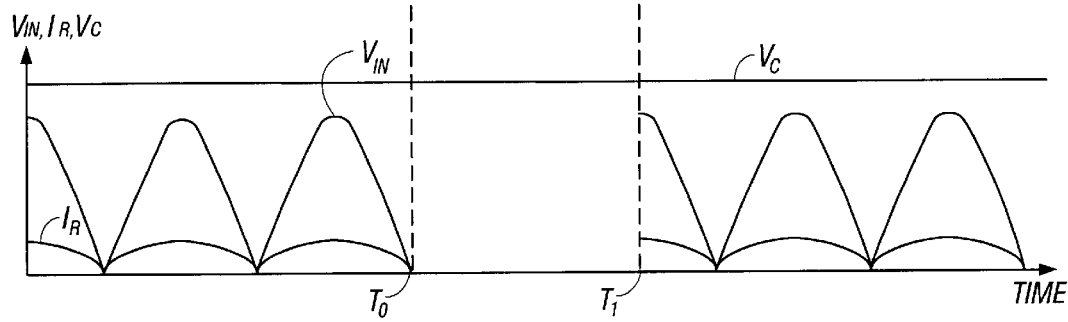
FIG. 4

REDUNDANT POWER SUBSYSTEM

This application is a continuation-in-part to U.S. patent application Ser. No. 09/670,891 entitled, "REDUNDANT POWER SUBSYSTEM," filed on Sep. 28, 2000 now abandoned.

BACKGROUND

The invention generally relates to a redundant power subsystem, such as a system to power a server, for example.

A typical computer system includes a power subsystem that provides and regulates various supply voltages that are used by and power the components of the computer system. As examples, the power subsystem may provide and regulate supply voltages for 5 volt (V), 3.3 V, 2.5 V, 1.8 V and 1.5V power planes (also called rails or voltage supply lines) of the computer system.

The power subsystem may include a full-wave bridge rectifier to convert an AC wall voltage into a voltage waveform that has a DC component. DC-to-DC voltage regulators of the power subsystem may convert this DC voltage to lower DC output voltages.

One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input terminal of the regulator in a manner that regulates its output voltage(s). The switching voltage regulator may be contained in a semiconductor package called a voltage regulator module.

Some computer systems, such as servers, may receive power from two AC power lines that provide two AC wall voltages, such as two 220 volt wall voltages. A purpose of this arrangement is to continue supplying power to a server system once one of the two AC wall voltages drops below a specified at which voltage regulator modules that are coupled to the corresponding AC power line may no longer be operational. For purposes of anticipating this condition, voltage regulator modules of the power subsystem may be connected to both AC power lines to implement a redundant scheme (a scheme that is often called a "2 plus 2" scheme).

For example, if the power subsystem needs at least two operational voltage regulator modules to power the computer system, then two voltage regulator modules may be coupled to one AC power line, and two other voltage regulator modules may be coupled to the other AC power line. In this manner, if both power lines are providing sufficient AC wall voltages, then four voltage regulator modules power the computer system. However, if one AC wall disappears, two (the minimum number) of the voltage regulator modules still provide the required power.

Each voltage regulator module may contribute significantly to the cost and size of the computer system. Thus, a difficulty with the above-described redundant system is that four voltage regulator modules are used, when only two of the voltage regulator modules are needed at any one time.

Thus, there is a continuing need for an arrangement that addresses one or more of the problems that are stated above.

BRIEF DESCRIPTION OF THE DRAWING

FIG. 2 is a table depicting states of the power subsystem of FIG. 1 according to an embodiment of the invention.

FIGS. 3 and 4 depict waveforms of the power subsystem according to different embodiments of the invention.

DETAILED DESCRIPTION

Figure 1:
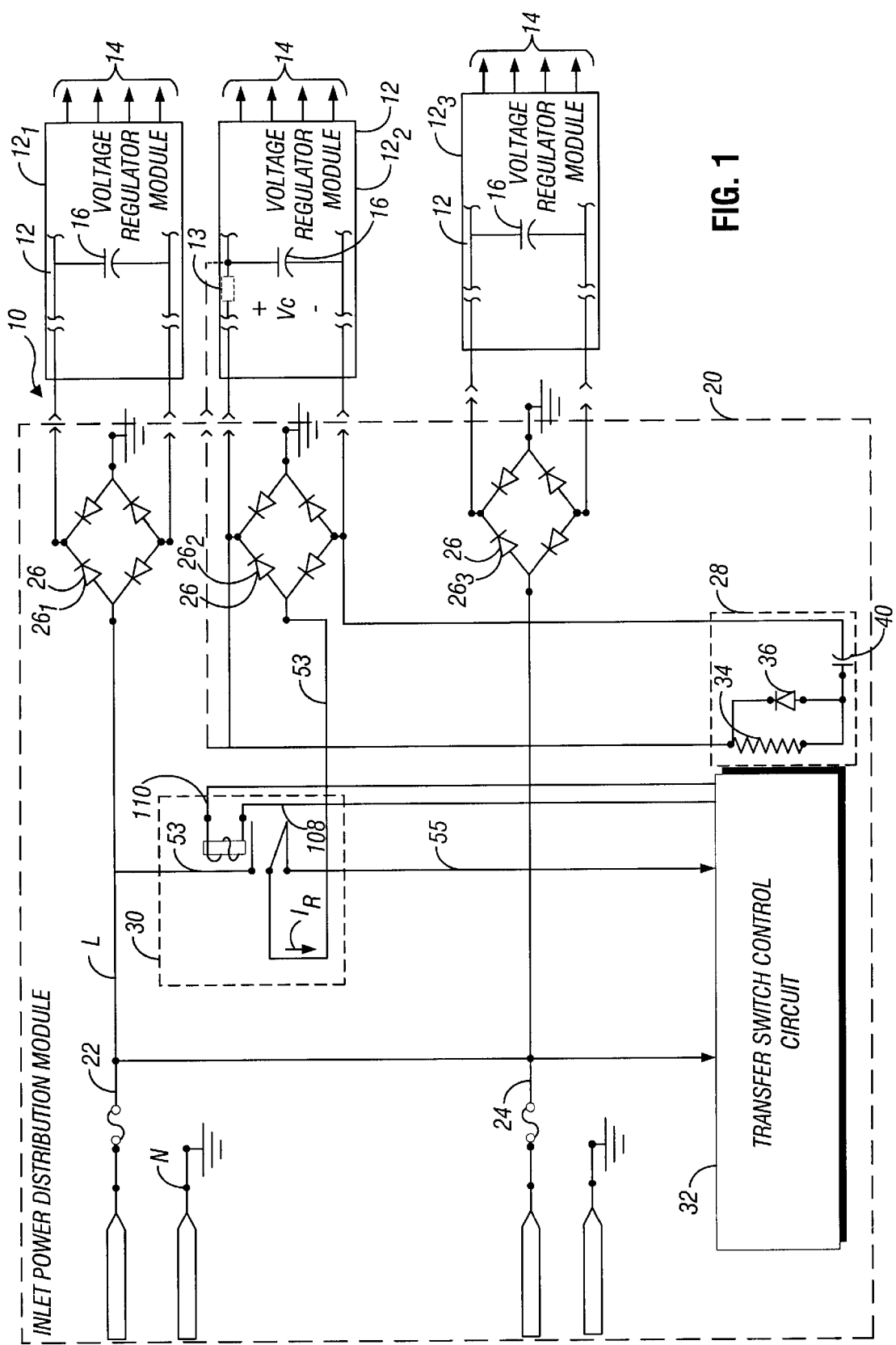
FIG. 1 is a schematic diagram of a redundant power subsystem according to an embodiment of the invention.

Referring to FIG. 1, an embodiment 10 of a redundant power subsystem in accordance with the invention includes three voltage regulator modules $12_1$, $12_2$ and $12_3$ (each having a similar design 12), each of which is capable of providing various regulated DC output voltages at output terminals 14. An inlet power distribution module 20 (of the power subsystem 10) routes power from two AC power lines 22 and 24 to the voltage regulator modules $12_1$, $12_2$ and $12_3$. As an example, the output terminals 14 may be coupled to supply voltage planes of a computer system (a server, for example) to provide power to the components of the computer system.

In some embodiments of the invention, each voltage regulator module 12 may be a semiconductor package that is inserted into a corresponding module slot connector (not shown). Each voltage regulator module 12 may include a switching voltage regulator (such as a Boost switching regulator, for example) that has input and output terminals that form a power factor correction circuit in the voltage regulator module 12. Other types of switching voltage regulators may be used. The voltage regulator modules 12 may be identical in some embodiments of the invention so that a particular voltage regulator module 12 may be inserted into any one of the slot connectors.

Because only two of the voltage regulator modules 12 may be needed to power the computer system, the third voltage regulator module 12 is present to provide redundancy, i.e., to supply power if one of the modules 12 fails and for purposes of ensuring that the power subsystem 10 accommodates a failure of one of the power lines 22 and 24 to provide a sufficient AC voltage. As an example, the nominal voltage of each power line 22, 24 may be near 220 volts AC. In some embodiments of the invention, the voltage regulator module $12_1$ is coupled to receive power from the power line 22, and the voltage regulator module $12_3$ is coupled to receive power from the power line 24.

The inlet power distribution module 20 monitors the AC voltages of the power lines 22 and 24 and selectively couples the voltage regulator module $12_2$ to receive power from one of the power lines 22 and 24 in response to this monitoring so that the voltage regulator module $12_2$ is always coupled to a power line that provides a sufficient AC voltage. For example, for the case of where the AC voltage of each power line 22 and 24 is above an acceptable level (or sufficient), the inlet power distribution module 20 couples the voltage regulator module $12_2$ to receive power from the power line 24. Thus, for the scenario where the AC power lines 22 and 24 both provide sufficient AC voltages, the three voltage regulator modules $12_1$, $12_2$ and $12_3$ each produce regulated output voltages and power the computer system.

In this context, a power line provides a sufficient AC voltage when a rectified and filtered and/or converted version of the AC voltage is at or exceeds a level that keeps a voltage regulator module that is coupled to the power line operational. This level also may be defined in terms of a predetermined RMS or peak-to-peak threshold value that is associated with the AC voltage. Quite often, after the AC voltage of the power line 22, 24 decreases below the threshold value, the AC voltage may disappear.

As long as the AC voltage of the power line 24 remains sufficient, the inlet power distribution module 20 keeps the voltage regulator module $12_2$ coupled to receive power from the power line 24. Therefore, at least the two voltage regulator modules $12_2$ and $12_3$ receive power from the power line 24 and provide the requisite minimum power to the computer system regardless of whether the voltage regulator module $12_1$ receives a sufficient AC voltage and is operational.

The inlet power distribution module 20 monitors the AC voltage of the power line 24, so that should the AC voltage of the power line 24 become insufficient, the inlet power distribution module 20 initiates a transfer in which the inlet power distribution module 20 isolates the voltage regulator module $12_2$ from the power line 24 and couples the voltage regulator module $12_2$ to the power line 22. Therefore, when the AC voltage of the power line 22 is sufficient and the AC voltage of the power line 24 is not, the voltage regulator modules $12_1$ and $12_2$ provide the requisite power to the computer system.

The states of the voltage regulator modules 12 are summarized in a table that is depicted in FIG. 2. As shown, when the AC voltage on the power line 22 is insufficient (or "fails"), the voltage regulator module $12_1$ is not operational and does not provide power to the computer system. Otherwise, the voltage regulator $12_1$ is operational and does provide power to the computer system. When the AC voltage on the power line 24 is insufficient (or fails), the voltage regulator module $12_3$ is not operational, and thus, does not provide power to the computer system. Otherwise, the voltage regulator $12_3$ is operational and does provide power to the computer system. As long as the AC voltage on one of the power lines 22 and 24 is sufficient, the voltage regulator module $12_2$ assists one of the voltage regulator modules $12_1$ and $12_3$ in providing power to the computer system.

Thus, a possible advantage of the power subsystem 10 is that three instead of four voltage regulator modules (two for each power line) may be used, thereby minimizing the number of required voltage regulator modules to implement a redundant power subsystem that needs to have two operational voltage regulators if one of the power lines fails. A second possible advantage is that the power distribution module 20 switches just one of the three voltage regulator modules 12 and may have a comparatively small size. Other and different advantages may be possible.

Referring back to FIG. 1, in some embodiments of the invention, the inlet power distribution module 20 includes fall-wave bridge rectifiers $26_1$, $26_2$ and $26_3$ that rectify the AC voltages on the power lines 22 and 24 to produce signals that have DC components. The inlet power distribution module 20 provides the rectified AC voltages to the voltage regulator modules $12_1$, $12_2$ and $12_3$ to implement the redundancy scheme that is described above.

More specifically, each full-wave bridge rectifier $26_1$, $26_2$, $26_3$ includes two AC input terminals to receive an AC input voltage and two DC output terminals to provide the resultant rectified AC signal that has a DC component. One AC input terminal of the bridge rectifier $26_1$ is coupled to neutral (N), and the other AC input terminal of the bridge rectifier $26_1$ is coupled to the power line 22, or so called "line" (L). The DC output terminals of the bridge rectifier $26_1$ are coupled to the input terminals of the voltage regulator module $12_1$. Thus, when an AC voltage is present on the power line 22, the input terminals of the voltage regulator module $12_1$ receive a signal that is a full-wave rectified version of the AC voltage on the power line 22. Similarly, one AC input terminal of the bridge rectifier $26_3$ is coupled to neutral, and the other AC input terminal of the bridge rectifier $26_3$ is coupled to the power line 24. The DC output terminals of the bridge rectifier $26_3$ are coupled to the input terminals of the voltage regulator module $12_3$. Thus, when an AC voltage is present on the power line 24, the input terminals of the voltage regulator module $12_3$ receive a signal that is a full-wave rectified version of the AC voltage on the power line 24. The neutrals of the power lines 22 and 24 may be coupled together or may be isolated from each other.

Thus, the bridge rectifiers $26_1$ and $26_3$, in some embodiments of the invention, are each hardwired to receive power from the power lines 22 and 24. However, the bridge rectifier $26_2$ receives power as directed by a relay 30 of the inlet power distribution module 20. More particularly, a transfer switch control circuit 32 of the inlet power distribution module 20 determines whether a sufficient AC voltage exists on the power line 24 (or/and 22) and operates the relay accordingly. In this manner, if a sufficient AC voltage exists on the power line 24 and the voltage regulator module $12_2$ receives power from the power line 24, the transfer switch control circuit 32 does not activate the relay 30 of the module 20. In its non-activated state, the relay 30 couples an AC input terminal of the bridge rectifier $26_2$ to the power line 24. The other AC input terminal of the bridge rectifier $26_2$ is coupled to neutral. The DC output terminals of the bridge rectifier $26_2$ are coupled to the input terminals of the voltage regulator module $12_2$. Thus, when a sufficient AC voltage is present on the power line 24, the input terminals of the voltage regulator module $12_2$ receive a signal that is a full-wave rectified version of the AC voltage that is present on the power line 24.

However, if the transfer switch control circuit 32 determines that the AC voltage present on the power line 24 is insufficient, then the transfer switch control circuit 32 activates the relay 30 to couple an AC input terminal of the bridge rectifier $26_2$ to the power line 22 instead of to the power line 24. The other AC input terminal of the bridge rectifier $26_2$ remains coupled to neutral. If the neutrals of power lines 22 and 24 are isolated, then a double pole/double throw relay (for the relay circuit 30) may be used. In this case, the relay couples a neutral input terminal of the bridge rectifier $26_2$ to the neutral of the AC line 22 instead of coupling this neutral input terminal to the neutral of power line 24. Thus, when the AC voltage that is present on the power line 24 is insufficient and an AC voltage that is present on the power line 22 is sufficient, the input terminals of the voltage regulator module $12_2$ receive a signal that is a full-wave rectified version of the AC voltage that is present on the power line 22.

In embodiments of the invention in which the neutrals of the power lines 22 and 24 are coupled together, the relay 30 includes three main switching contact terminals 52, 53 and 55 and two control terminals 108 and 110 of the winding of the relay 30. In embodiments of the invention in which the neutrals of the power lines 22 and 24 are isolated, the relay circuit 30 includes six main switching contact terminals. As depicted in FIG. 1, the contact terminal 53 is coupled to the power line 22, the contact terminal 55 is coupled to the power line 24 and the contact terminal 52 is coupled to an AC input terminal of the bridge rectifier $26_2$. The control terminals 108 and 110 of the relay 30 are coupled to the transfer switch control circuit 32.

To couple the power line 22 to the AC input terminal of the bridge rectifier 26₂, the transfer switch control circuit 32 creates a voltage difference across the control terminals 108 and 110 to activate the relay 30 and cause the relay 30 to couple the contact terminals 52 and 53 together. To couple the power line 24 to the AC input terminal of the bridge rectifier 26₂, the transfer switch control circuit 32 does not drive the terminals 108 and 110 to cause the relay 30 to couple the terminals 52 and 55 together. Specific details of the transfer switch control circuit 32 are described below.

As depicted in FIG. 1, each voltage regulator module 12 may include at least one filter capacitor 16 (often referred to as a "bulk capacitor") that also serves an energy source that is depleted by the load that is coupled to the module 12. As an example, such capacitor may be coupled between one of the output terminals 14 of the module 12 and ground and/or may be separated from the input terminals of the voltage regulator module 12 by one or more components (such as an inductor and a diode of an input Boost regulator, as examples) of the module 12. Each module 12 may include a power factor correction (PFC) circuit, such as the PFC 13 that is depicted in the voltage regulator module 12₂. The PFC 13 is coupled between the rectifier 26₂ and the capacitor 16 of the voltage regulator module 12₂. When the PFC 13 is used, the resistor 34 is coupled to the capacitor 16 to receive the $V_C$ voltage, as depicted by the dashed line 15 in FIG. 1.

During a time interval (herein called a "transfer interval") when the voltage regulator module 12₂ is switched from one power line 22, 24 to the other power line 22, 24, a voltage (called $V_C$) across the terminals of the capacitor 16 of the module 12₂ may momentarily droop, or decrease, as the module 12₂ is not coupled to receive power from either power line 22, 24.

As an example, FIG. 3 depicts a possible scenario in which the module 12₂ is switched between the power lines 22 and 24. FIG. 3 shows the $V_C$ voltage, a voltage (called $V_{IN}$) across the input terminals of the voltage regulator module 12₂ and a current (called $I_R$) that passes through the contact terminals of the relay during the transfer interval. Before time $T_0$, the voltage regulator module 12₂ regulates the $V_C$ voltage near a voltage level called $V_1$. At time $T_0$, the transfer switch control circuit 32 changes the activation state of the relay 30 to couple the voltage regulator module 12₂ to receive power from a different power line 22, 24. However, the transfer interval is not instantaneous, as the transfer between power lines 22 and 24 takes place during an interval from time $T_0$ to time $T_1$.

As depicted in FIG. 3, the $V_{IN}$ input voltage is a full-wave rectified version of an AC voltage before time $T_0$ in which the $V_{IN}$ input voltage is provided by one of the power lines 22 and 24 and after time $T_1$ in which the $V_{IN}$ input voltage is provided by another one of the power lines 22 and 24. During the $T_0$ to $T_1$ time interval (the transfer interval), the $V_{IN}$ voltage drops to zero volts, as the voltage regulator module 12₂ is not coupled to one of the power lines 22 and 24. Thus, during this time interval, the $V_C$ voltage decreases below a lower voltage level (called $V_2$), as effectively power is being received by the voltage regulator module 12₂, and the bulk capacitor 16 is being discharged and depleted of its stored energy.

Although the $V_C$ voltage may decrease during the transfer interval, the output voltages (that appear at the output terminals 14) of the voltage regulator module 12₂ remain within acceptable ranges. However, due to the decrease in the $V_C$ voltage level, at the end of the transfer interval, the $V_C$ voltage discontinuously changes due to the reemergence of the $V_{IN}$ voltage which could exceed the $V_C$ level. The discontinuity and polarity change in the voltage difference between the $V_{IN}$ and $V_C$ voltages, in turn, produce a spike in the $I_R$ switching current. For the example depicted in FIG. 3, at time $T_1$, the transfer interval ends and a spike 70 occurs in $I_R$ switching current. This current spike, in turn, may damage components of the power subsystem 10, such as the relay 30.

Referring back to FIG. 1, for purposes of suppressing the spike 70 in the $I_R$ current, in some embodiments of the invention, the power subsystem 10 may include an energy storage circuit 28 to supply energy to the voltage regulator module 12₂ during the transfer interval to keep the $V_C$ voltage from significantly decreasing, or drooping. As a result of this supply of stored energy, the $V_C$ voltage remains nearly constant during the transfer interval, thereby minimizing, if not effectively eliminating, any spike in the $I_R$ current, as depicted in FIG. 4 for embodiments where the power subsystem 10 includes the energy storage circuit 28.

In some embodiments of the invention, the energy storage circuit 28 includes a capacitor 40 that has one terminal that is coupled to a DC input terminal of the voltage regulator module 12₂. A resistor 34 is coupled between the other terminal of the capacitor 40 and the other DC input terminal of the voltage regulator module 12₂ to regulate a rate at which the capacitor 40 charges. Due to this arrangement, as long as an AC voltage appears on the power line 22, 24 to which the voltage regulator module 12₂ is coupled and as long as the capacitor 40 is not fully charged, a small current trickles into the capacitor 40 to charge the capacitor 40. Eventually, the capacitor 40 becomes fully charged. Thus, if the AC voltage to which the voltage regulator module 12₂ was coupled disappears, the energy that is stored in the capacitor 40 is transferred to the voltage regulator module 12₂.

The energy storage circuit 28 may include, in some embodiments of the invention, a diode 36 that is coupled to shunt the resistor 34 to provide a low resistance path for energy to flow from the capacitor 40 to the voltage regulator module 12₂ during the transfer interval.

Thus, due to the above described arrangement, the bulk capacitor 16 does not need to be large to maintain the $V_C$ voltage during the transfer interval, as the portion of the stored energy that is needed to maintain the $V_C$ voltage comes from the capacitor 40. The voltage regulator module 12 may be a semiconductor package, and the capacitor 16 typically is the largest component of the module 12. Therefore, by not requiring that the capacitor 16 to be large to sustain the $V_C$ voltage during the transfer interval, the size of the capacitor 16 may be minimized. Furthermore, with the energy storage occurring outside of the voltage regulator module 12₂, the voltage regulator modules 12₁, 12₂ and 12₃, may be identical and thus, may be interchangeable.

Thus, the capacitor 40 is sized to maintain the $V_C$ voltage near its $V_1$ voltage level during the switching interval. As an example, in some embodiments of the invention, the capacitor 40 may be sized to maintain the $V_C$ voltage within approximately ten to fifteen percent of the $V_1$ voltage level during the switching interval, an interval that may last for approximately 25 milliseconds. Without the capacitor 40, the $V_C$ voltage may fall to a level that is approximately 65 to 70 percent of the $V_1$ voltage level.

Figure 5:
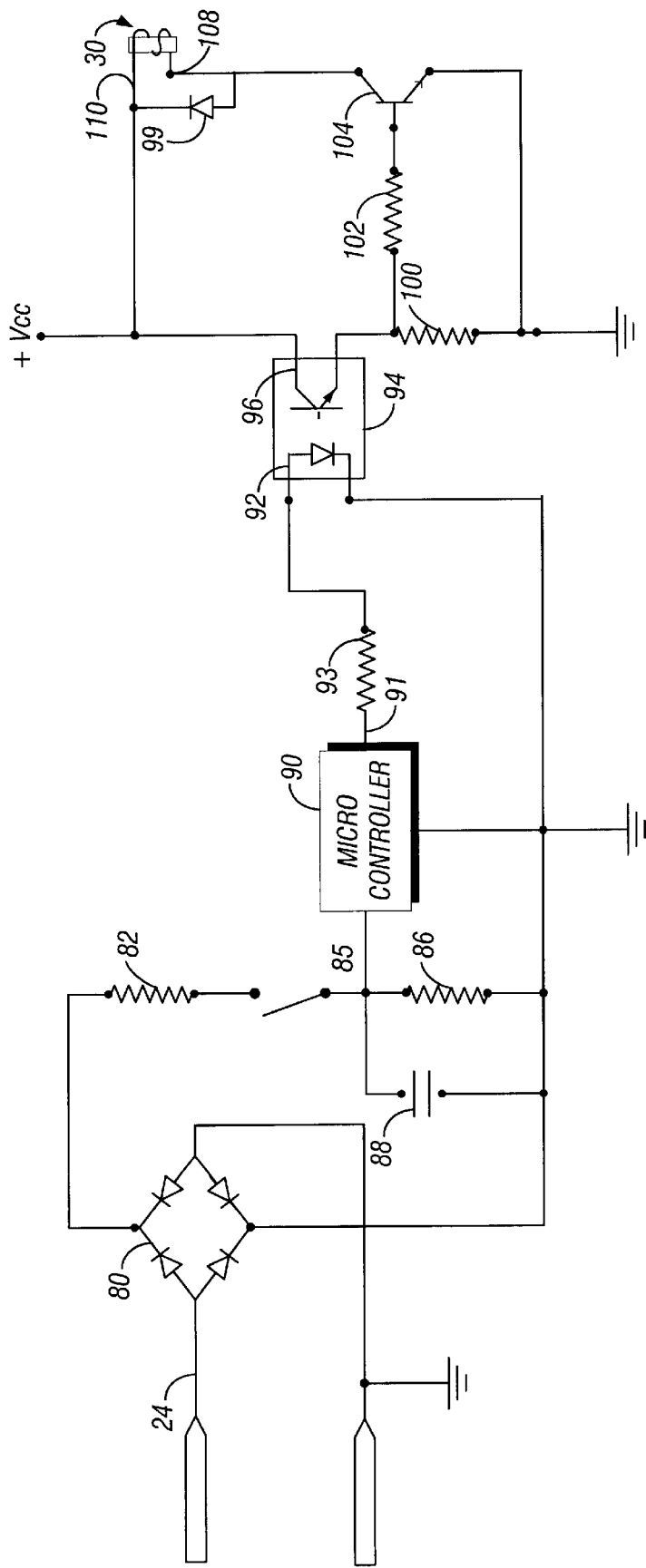
FIG. 5 is a schematic diagram of a transfer switch control circuit of the power subsystem according to an embodiment of the invention.

Referring to FIG. 5, in some embodiments of the invention, the transfer switch control circuit 32 may include a full-wave bridge rectifier 80 that rectifies the AC voltage present (if any) on the power line 24 and provides (via its DC output terminals) a full-wave rectified version of the AC voltage to a low pass filter that is formed from two resistors 82 and 86 and a capacitor 88. In this manner, the resistor 82 is coupled between the positive DC output terminal of the bridge rectifier 80 and an analog input terminal 85 of a microcontroller 90 of the transfer switch control circuit 32. The resistor 86 is coupled between the input terminal 85 and ground. The negative DC output terminal of the bridge rectifier 80 is coupled to ground. Thus, due to this arrangement, the input terminal 85 provides an analog DC voltage that indicates a level of the AC voltage that is present on the power line 24.

When this level drops below a predetermined threshold (a predefined voltage level, for example), the microcontroller 90 asserts (drives high, for example) a signal at its output terminal 91 for purposes of activating the relay 30 to decouple the voltage regulator module 12$_2$ from receiving power from the power line 24 and couple the voltage regulator module 12$_2$ to receive power from the power line 22. The microcontroller 90 otherwise deasserts (drives low, for example) the signal at its output terminal 91, a state in which the voltage regulator module 12$_2$ is coupled to receive power from the power line 24.

A resistor 93 is coupled between the output terminal 91 and an anode of a diode 94 of an optical isolation circuit 92 (as called an "opto coupler"). The cathode of the diode 94 is coupled to ground. Thus, due to this arrangement, when the microcontroller 90 asserts the signal at its output terminal 91, the diode 94 conducts to produce light that causes an NPN bipolar junction transistor (BJT) 96 of the optical isolation circuit 92 to conduct. The collector terminal of the BJT 96 is coupled to a supply voltage (called V$_{CC}$), and the emitter terminal of the BJT 96 is coupled to one terminal of the resistor 100. The other terminal of the resistor 100 is coupled to ground. Thus, the signal at the emitter terminal of the BJT 96 follows the signal at the output terminal 91 of the microcontroller 90.

A resistor 102 couples the emitter terminal of the BJT 96 to a base terminal of another BJT 104. The emitter terminal of the BJT 104 is coupled to ground, and the collector terminal of the BJT 104 is coupled to the control terminal 108 of the relay 30. The other control terminal 110 of the relay 30 is coupled to the V$_{CC}$ supply voltage.

Thus, due to this arrangement, when the microcontroller 90 asserts the signal at its output terminal 90 in response to the detection of an insufficient AC voltage on the power line 24, the collector-to-emitter path of the BJT 104 conducts to place a voltage approximately equal to V$_{CC}$ across the contact terminals 108 and 110. This voltage, in turn, activates the relay 30 and causes the relay 30 to decouple the voltage regulator module 12$_2$ from receiving power from the power line 24 and couple the voltage regulator module 12$_2$ to the receive power from the power line 22. When the AC voltage that is present on the power line 24 is sufficient, the collector-to-emitter path of the BJT 104 does not conduct, thereby placing approximately zero volts across the contact terminals 108 and 110. Therefore, for this scenario, the relay 30 is not activated and the voltage regulator module 12$_2$ is coupled to receive power from the power line 24. In some embodiments of the invention, the microcontroller 90 may be programmed to de-activate the relay circuit 30 when the voltage of the power line 24 returns to its nominal level after it drops off.

In some embodiments of the invention, a diode 99 is coupled to the contact terminals 108 and 110 to discharge stored energy in the control winding of the relay 30 to suppress voltage spikes. In this manner, the cathode of the diode 99 is coupled to the contact terminal 110, and the anode of the diode 99 is coupled to the contact terminal 108.

Figure 6:
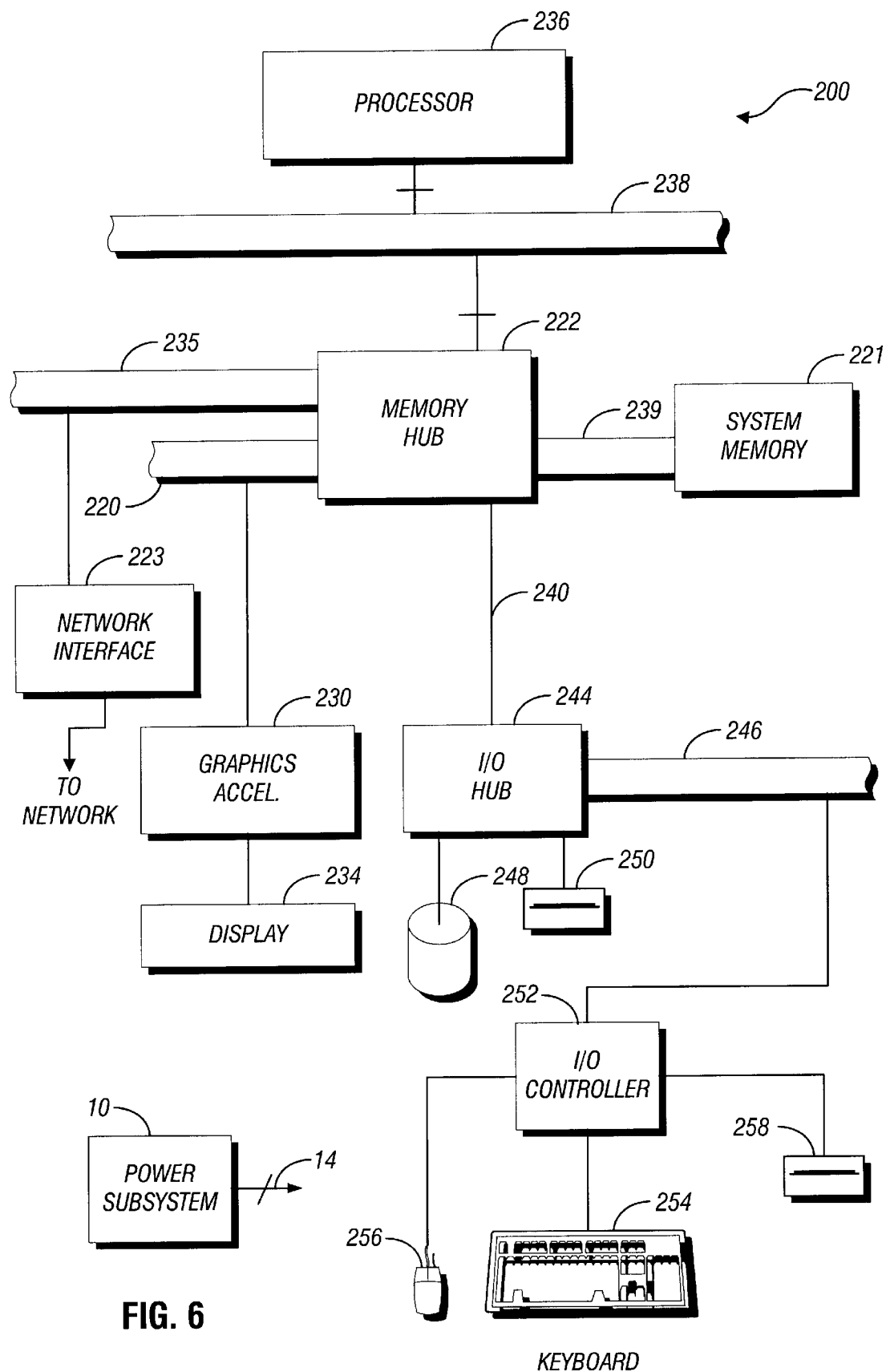
FIG. 6 is a schematic diagram of a computer system according to an embodiment of the invention.

Referring to FIG. 6, in some embodiments of the invention, the power subsystem 10 may provide power to the components of a computer system 200. For example, the power subsystem 10 may provide power to a processor 236 of the computer system 200. In this context, the term "processor" may refer to, as examples, to at least one microcontroller, X86 microprocessor, Advanced RISC Machine (ARM) microprocessor or Pentium microprocessor. Other types of processors are possible and are within the scope of the appended claims.

The processor 236 may be coupled to a local bus 238 along with a north bridge, or memory hub 222. The memory hub 222 may represent a collection of semiconductor devices, or a "chip set," and provide interfaces to a Peripheral Component Interconnect (PCI) bus 235 and an Accelerated Graphics Port (AGP) bus 220. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A graphics accelerator 230 may be coupled to the AGP bus 220 and provide signals to drive a display 234. The PCI bus 235 may be coupled to a network interface 223, for example. The memory hub 222 may also provide an interface to a memory bus 239 that is coupled to a system memory 221.

A south bridge, or input/output (I/O) hub 244, is coupled to the memory hub 222 via a hub link 240. The I/O hub 244 represents a collection of semiconductor devices, or a chip set, and provides interfaces for a hard disk drive 248, a CD-ROM drive 250 and an I/O expansion bus 246, as just a few examples. An I/O controller 252 may be coupled to the I/O expansion bus 246 and receive input data from a mouse 256 and a keyboard 254. The I/O controller 252 may also control operations of a floppy disk drive 258, for example.

Figure 7:
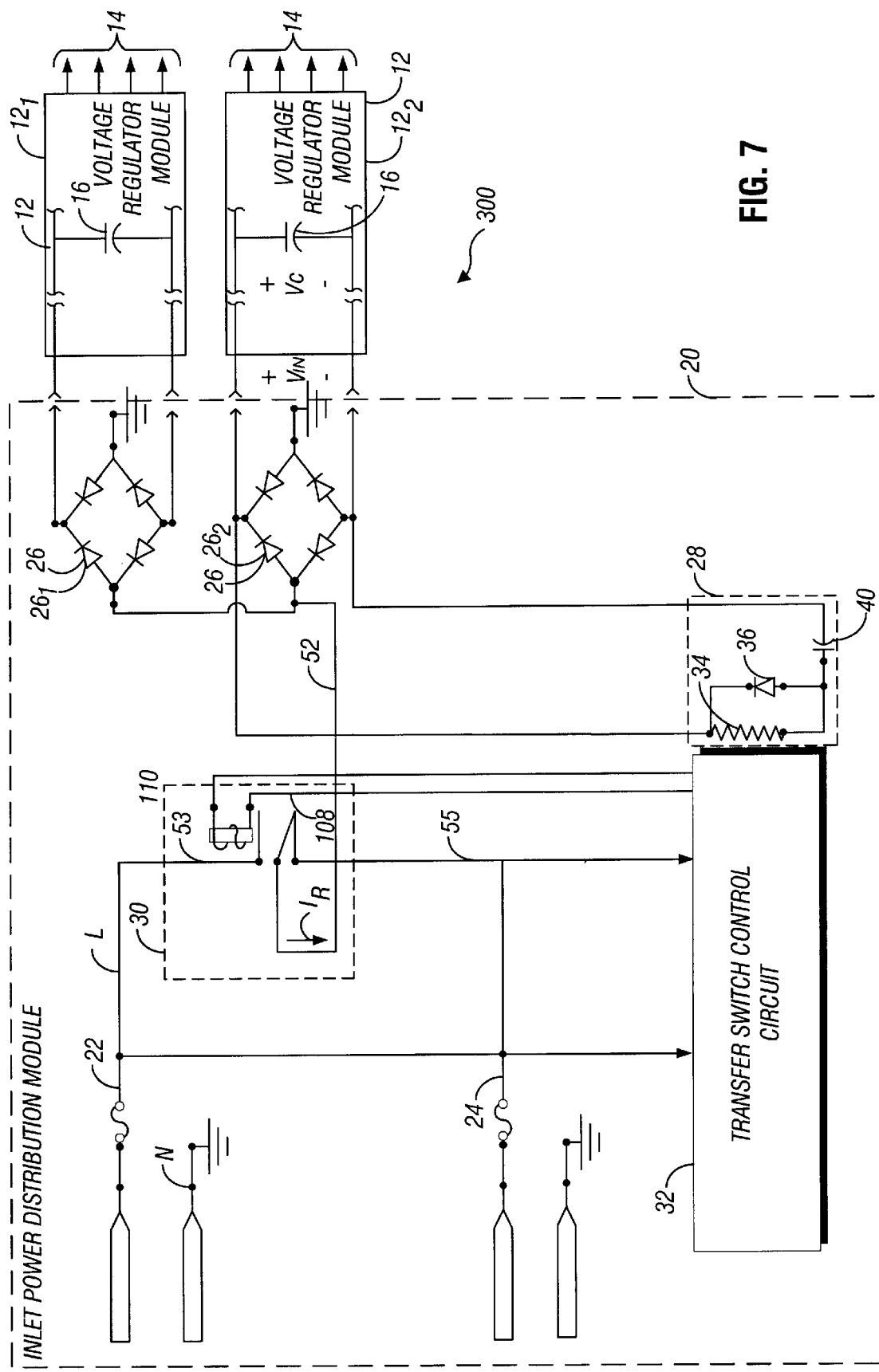
FIG. 7 is a schematic diagram of a redundant power subsystem according to another embodiment of the invention.

Other embodiments are within the scope of the following claims. For example, referring to FIG. 7, in some embodiments of the invention, a power subsystem 300 may be used in place of the power subsystem 10. The power subsystem 300 has a similar design to the power subsystem 10 except for the following differences. In particular, in the power subsystem 300 the AC input terminal of the bridge rectifier 12$_1$ is coupled to the main contact terminal 52 instead of being coupled to the power line 22, and the subsystem 300 does not have the third voltage regulator module 12$_3$. Instead, due to these connections, the transfer switch control circuit 32 switches the voltage regulator modules 12$_1$ and 12$_2$ together to one of the power lines 22, 24 that has a sufficient AC voltage. Thus, if the voltage regulator modules 12$_1$ and 12$_2$ are coupled to the power line 22 and the AC voltage of the power line 22 drops below a sufficient level, then the transfer switch control circuit 32 operates the relay circuit 30 to switch the voltage regulator modules 12$_1$ and 12$_2$ to the power line 24. Conversely, if the voltage regulator modules 12$_1$ and 12$_2$ are coupled to the power line 24 and the AC voltage of the power line 24 drops below a sufficient level, then the transfer switch control circuit 32 operates the relay circuit 30 to switch the voltage regulator modules 12$_1$ and 12$_2$ to the power line 22. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

in response to a switching interval, decoupling a voltage regulator from receiving power from a first power line and coupling the voltage regulator to receive power from a second power line;

storing energy in an energy storage circuit;

coupling an impedance to the energy storage circuit to limit a rate at which energy is stored in the circuit; and in response to the switching interval, bypassing the impedance and coupling the energy storage circuit to an input terminal of the voltage regulator to maintain a voltage of a capacitor of the regulator near a voltage level present before the beginning of the switching interval.

2. The method of claim 1, wherein the coupling of the energy storage circuit maintains am input voltage of the voltage regulator near a voltage level present the beginning of the switching interval.

3. The method of claim 1, wherein the coupling of the energy storage circuit maintains the voltage of a capacitor of the voltage regulator within approximately ten percent of a voltage level of the capacitor present before the beginning of the switching interval.

4. A system comprising:

power lines;

a voltage regulator capable of being switched from one of the power lines to another one of the power lines in response to a switching interval, the regulator having an input terminal, the voltage regulator including a capacitor; and an energy storage circuit coupled to the voltage regulator to receive energy through an impedance and in response to the switching interval, bypass the impedance and provide energy to the voltage regulator during the switching interval to maintain a voltage of the capacitor near a voltage level present before the beginning of the switching interval.

5. The system of claim 4, wherein the energy storage circuit comprises another capacitor coupled to an input terminal of the voltage regulator.

6. The system of claim 5, wherein the impedance comprises a resistor coupled between said another capacitor and the input terminal.

7. The system of claim 4, further comprising:

a diode to shunt the impedance in response to the switching interval.

8. The system of claim 4, wherein the energy provided by the energy storage circuit maintains am input voltage of the voltage regulator near a voltage level present at the beginning of the switching interval.

9. The system of claim 4, wherein the energy provided by the energy storage circuit maintains the voltage of a capacitor of the voltage regulator within approximately ten percent of a voltage level of the capacitor present before the beginning of the switching interval.

* * * * *

UNITED STATES PATENT AND TRADEMARK OFFICE
CERTIFICATE OF CORRECTION

PATENT NO. : 6,628,013 B2
DATED : September 30, 2003
INVENTOR(S) : Viktor D. Vogman It is certified that error appears in the above-identified patent and that said Letters Patent is hereby corrected as shown below:

Column 9,
Line 22, "am" should be -- an --;
Line 24, after "present" insert -- at --.

Column 10,
Line 23, "am" should be -- an --.

Signed and Sealed this

Ninth Day of December, 2003

JAMES E. ROGAN
*Director of the United States Patent and Trademark Office*